US008223511B2

(12) United States Patent
Cheng et al.

(10) Patent No.: US 8,223,511 B2
(45) Date of Patent: Jul. 17, 2012

(54) COMMON MODE VOLTAGE REDUCTION APPARATUS AND METHOD FOR CURRENT SOURCE CONVERTER BASED DRIVE

(75) Inventors: Zhongyuan Cheng, Cambridge (CA); Navid Zargari, Cambridge (CA); Yuan Xiao, Kitchener (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 23 days.

(21) Appl. No.: 12/795,154

(22) Filed: Jun. 7, 2010

(65) Prior Publication Data
US 2011/0299308 A1 Dec. 8, 2011

(51) Int. Cl.
*H02J 3/36* (2006.01)
*H02M 5/458* (2006.01)
(52) U.S. Cl. .............. 363/35; 363/37; 363/40; 363/44
(58) Field of Classification Search .............. 363/34–37, 363/39, 40, 44
See application file for complete search history.

(56) References Cited

U.S. PATENT DOCUMENTS

| | | | |
|---|---|---|---|
| 6,166,929 A | 12/2000 | Ma et al. | |
| 6,269,010 B1 | 7/2001 | Ma et al. | |
| 6,359,416 B1 | 3/2002 | Rao et al. | |
| 6,366,483 B1 | 4/2002 | Ma et al. | |
| 6,469,916 B1 | 10/2002 | Kerkman et al. | |
| 6,477,067 B1 | 11/2002 | Kerkman et al. | |
| 6,541,933 B1 | 4/2003 | Leggate et al. | |
| 6,617,821 B2 | 9/2003 | Kerkman et al. | |
| 6,636,012 B2 | 10/2003 | Royak et al. | |
| 6,703,809 B2 | 3/2004 | Royak et al. | |
| 6,720,748 B1 | 4/2004 | Seibel et al. | |
| 6,819,070 B2 | 11/2004 | Kerkman et al. | |
| 6,819,077 B1 | 11/2004 | Seibel et al. | |
| 6,839,249 B2 * | 1/2005 | Kalman et al. | 363/35 |
| 6,842,354 B1 | 1/2005 | Tallam et al. | |
| 6,982,533 B2 | 1/2006 | Seibel et al. | |
| 7,034,501 B1 | 4/2006 | Thunes et al. | |
| 7,106,025 B1 | 9/2006 | Yin et al. | |
| 7,164,254 B2 | 1/2007 | Kerkman et al. | |
| 7,215,559 B2 | 5/2007 | Nondahl et al. | |
| 7,274,576 B1 | 9/2007 | Zargari et al. | |
| 7,336,509 B2 | 2/2008 | Tallam | |
| 7,342,380 B1 | 3/2008 | Kerkman et al. | |
| 7,356,441 B2 | 4/2008 | Kerkman et al. | |
| 7,400,518 B2 | 7/2008 | Yin et al. | |
| 7,471,525 B2 | 12/2008 | Suzuki et al. | |
| 7,495,410 B2 | 2/2009 | Zargari et al. | |
| 7,495,938 B2 | 2/2009 | Wu et al. | |
| 7,511,976 B2 | 3/2009 | Zargari et al. | |
| 7,990,097 B2 * | 8/2011 | Cheng et al. | 318/800 |
| 2007/0211501 A1 | 9/2007 | Zargari et al. | |

(Continued)

OTHER PUBLICATIONS

Taiwan Patent Publication TW439350, Jun. 7, 2001.

(Continued)

*Primary Examiner* — Gary L Laxton
(74) *Attorney, Agent, or Firm* — Fay Sharpe LLP; Alex Kuszewski; John M. Miller

(57) ABSTRACT

Current source converter drives and common mode voltage reduction techniques are presented in which a space vector modulation zero vector for current source inverter (or rectifier) control is selected according to the switching state of the current source rectifier (or inverter) and according to the AC input power and the AC output power to control the output common mode voltage.

15 Claims, 4 Drawing Sheets

U.S. PATENT DOCUMENTS

2007/0297202 A1 12/2007 Zargari et al.
2008/0180055 A1 7/2008 Zargari et al.
2009/0128083 A1 5/2009 Zargari
2010/0025995 A1 2/2010 Lang et al.
2010/0080028 A1 4/2010 Cheng et al.

OTHER PUBLICATIONS

Emre Un and Ahmet M. Hava, "A Near State PWM Method With Reduced Switching Frequency and Reduced Common Mode Voltage for Three-Phase Voltage Source Inverters", 2007 IEEE.

A.M.De Broe, A.L. Julian, and T.A. Lipo, "Neutral-To-Ground Voltage Minimization in a PWm-Rectifier/Inverter Configuration", Power Electronics and Variable Speed Drives, Sep. 23-25, 1996, Conference Publication No. 429, IEEE, 1996.

Jay M. Erdman, Russel J. Kerkman, David W. Schlegel, and Gary L. Skibinski, "Effect of PWM Inverters on AC Motor Bearing Currents and Shaft Voltages", 1996 IEEE.

A. Muetze & A. Binder, "Don't Lose Your Bearings", Mitigation techniques for bearing currents in inverter-supplied drive systems, 2006 IEEE.

Yeb-Shin Lai and Fu-San Shyu, "Optimal Common-Mode Voltage Reduction PWM Technique for Inverter Control with Consideration of the Dead-Time Effects-Part I: Basic Development", 2004 IEEE.

Qiang Yin, Russel J. Kerkman, Thomas A. Nondahl, and Haihui Lu, "Analytical Investigation of the Switching Frequency Harmonic characteristic for Common Mode Reduction Modulator", 2005 IEEE.

Russel J. Kerkman, David Leggate, Dave Schlegel, and Gary Skibinski, "PWM Inverters and Their Influence on Motor Over-Voltage", 1997 IEEE.

Emre Un and Ahmet M. Hava, "A High Performance PWM Algorithm for Common Mode Voltage Reduction in Three-Phase Voltage Source Inverters", 2008 IEEE.

* cited by examiner

144c

210

FROM 208 IN FIG. 2A

212 — DETERMINE RECTIFIER COMMON MODE VOLTAGE $V_{zg}$ ACCORDING TO RECTIFIER SWITCHING STATES AND AC INPUT VOLTAGES a, b, c:

| Rectifier Switching State | Switches ON | $V_{zg}$ |
|---|---|---|
| $I_1$ | S1, S2 | $0.5(a+c) = -0.5b$ |
| $I_2$ | S2, S3 | $0.5(b+c) = -0.5a$ |
| $I_3$ | S3, S4 | $0.5(a+b) = -0.5c$ |
| $I_4$ | S4, S5 | $0.5(a+c) = -0.5b$ |
| $I_5$ | S5, S6 | $0.5(b+c) = -0.5a$ |
| $I_6$ | S1, S6 | $0.5(a+b) = -0.5c$ |
| $I_7$ | S1, S4 | a |
| $I_8$ | S3, S6 | b |
| $I_9$ | S5, S2 | c |

214 — DETERMINE PROSPECTIVE INVERTER COMMON MODE VOLTAGE $V_{zo}$ FOR EACH POSSIBLE INVERTER ZERO VECTOR ACCORDING TO ACTIVE VECTORS OF SELECTED SEQUENCE AND AC OUTPUT VOLTAGES u, v, w:

$$V_{zo} = [S_1' + S_4' \quad S_3' + S_6' \quad S_5' + S_2'] \begin{bmatrix} 0.5u \\ 0.5v \\ 0.5w \end{bmatrix} = \begin{cases} -0.5v & \text{for } I_1 \text{ and } I_4 \\ -0.5u & \text{for } I_2 \text{ and } I_5 \\ -0.5w & \text{for } I_3 \text{ and } I_6 \\ u & \text{for } I_7 \\ v & \text{for } I_8 \\ w & \text{for } I_9 \end{cases}$$

216 — SELECT ZERO VECTOR FOR WHICH THE COMMON MODE VOLTAGE $V_{og} = |V_{zg} - V_{zo}|$ IS THE SMALLEST

COMMON MODE VOLTAGE REDUCTION APPARATUS AND METHOD FOR CURRENT SOURCE CONVERTER BASED DRIVE

BACKGROUND

Motor drives and other forms of power conversion systems convert electrical power from one form to another and may be employed in a variety of applications such as powering an electric motor using power converted from a single or multiphase AC input source. Such power converters are typically constructed using an active rectifier to convert input AC power to an intermediate DC, followed by an active inverter stage that converts the intermediate DC to AC output power to drive a motor, power grid, or other load. The rectifier and inverter include switches actuated through various forms of pulse width modulation (PWM), where the PWM switching states used in the rectifier and inverter may be constructed according to selective harmonic elimination (SHE) or space vector modulation (SVM) or other PWM techniques. Current source converter (CSC) type drives use the rectifier to provide a controlled DC current in an intermediate DC link circuit, which is then converted by the inverter into output currents provided to the load, where the link circuit includes one or more inductances, such as a link choke. In contrast, voltage source converters (VSCs) regulate the DC voltage across a capacitance in the intermediate circuit and a voltage source inverter (VSI) generates output waveforms by converting the intermediate DC bus voltage. It is often important to control the amount of common mode voltages seen by the load in motor drives and other power converters. For example, motors are susceptible to damage or performance degradation caused by appearance of excessive common mode voltages on the motor leads. In voltage source converters, the common mode voltage at the load output is related to the regulated DC link voltage, and thus common mode voltage control techniques have been advanced which carefully select VSI inverter switching patterns to reduce output common mode voltages. U.S. Pat. No. 7,164,254 to Kerkman et al., issued Jan. 16, 2007 and assigned to the assignee of the present application discloses common mode voltage reduction techniques in which the switching sequence is modified to avoid using the zero vectors in order to reduce common mode voltages in the motor. The entirety of this patent is hereby incorporated by reference as if fully set forth herein. U.S. Pat. No. 7,106,025 to Yin et al., issued Sep. 12, 2006 and assigned to the assignee of the present application discloses techniques for canceling dead time effects in the algorithm to reduce common mode voltages produced by a three-phase power conversion device in a rectifier/inverter variable frequency drive (VFD), the entirety of which is hereby incorporated by reference as if fully set forth herein. U.S. Pat. No. 6,819,070 to Kerkman et al., issued Nov. 16, 2004 and assigned to the assignee of the present application discloses inverter switching control techniques to control reflected voltages in AC motor drives, the entirety of which is hereby incorporated by reference as if fully set forth herein. U.S. Pat. No. 7,034,501 to Thunes et al., issued Apr. 25, 2007 and assigned to the assignee of the present application discloses gate pulse time interval adjustment techniques for mitigating reflected waves in AC motor drives, the entirety of which is hereby incorporated by reference as if fully set forth herein. Current source converters, however, do not have a DC link with fixed voltage, and common mode control techniques for voltage source converters are not effective for addressing common mode voltages in current source converters. Instead, conventional current source converter common mode voltage control is typically accomplished by addition of isolation transformers and/or common mode output filter circuits including common mode capacitors connected to the output motor leads.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. The present disclosure provides techniques and apparatus for controlling output common mode voltages by coordination of the rectifier and inverter switching control without requiring isolation or filter components in current source converter drives.

In accordance with one or more aspects of the disclosure, a current source converter drive is provided, which includes a rectifier, an intermediate DC circuit, and an inverter, with a switch control system that provides switching control signals to the rectifier and the inverter. The rectifier includes AC input nodes receiving AC electrical input power, a DC output with first and second DC output nodes, and a rectifier switching network including rectifier switching devices individually coupled between one of the AC input nodes and one of the first and second DC output nodes. The rectifier switches individually operate according to corresponding rectifier switching control signals to selectively couple the corresponding AC input node with the corresponding DC output node. The intermediate DC circuit includes first and second DC current paths and one or more inductances. The inverter has AC output nodes for supplying power to a load, and includes an inverter switching network with inverter switching devices individually coupled between one of the DC current paths of the intermediate DC circuit and one of the AC output nodes. The inverter switches selectively couple the corresponding DC current path with the output according to inverter switching control signals to provide AC electrical output power to the load. The switch control system includes a rectifier control component providing the rectifier switching control signals to cause the rectifier to convert AC electrical input power to provide regulated DC power to the intermediate DC circuit, as well as an inverter control component providing the inverter switching control signals to cause the inverter to selectively convert DC current from the intermediate DC circuit to provide AC electrical power to the AC output according to one or more setpoint signals or values. In addition, a first one of the rectifier and inverter control components selects one of a plurality of zero vectors for space vector modulation (SVM) of the corresponding converter (rectifier or inverter) based at least in part on the switching state of the other converter.

In certain embodiments, the first converter control component is the inverter control component. In other implementations, the rectifier controller is the first control component, and operates the rectifier switches by space vector modulation with zero vector selection according to the switching state of the inverter.

In certain embodiments, the first converter control component selects the SVM zero vectors at least partially according to the switching state of the other converter, the AC electrical input voltage, and the AC electrical output voltage for controlling the output common mode voltage.

In some embodiments, the first converter control component determines the common mode voltage of the other converter based at least partially on the switching state of the other converter, and determines prospective common mode voltages of the corresponding converter for each possible SVM zero vector. The first converter control component selects the zero vector for which the absolute value of a difference between the determined common mode voltages is the smallest.

In certain embodiments, moreover, the first converter control component selects the SVM zero vector based in whole or in part on the switching state of the other converter if a measured output common mode voltage exceeds a threshold value and otherwise selects a zero vector according to another selection criteria.

In certain embodiments, moreover, the second converter control component provides the corresponding switching control signals using selective harmonic elimination pulse width modulation (SHE PWM), space vector modulation or trapezoidal pulse width modulation.

Further aspects of the disclosure provide a method of controlling a current source converter drive. The method includes selecting one of a plurality of zero vectors for SVM of a first one of a rectifier and an inverter based at least in part on a switching state of a second one of the rectifier and the inverter. The method further includes providing rectifier switching control signals to cause a plurality of rectifier switching devices of a rectifier to convert AC electrical input power to provide regulated DC power to an intermediate DC circuit, and providing inverter switching control signals to cause inverter switching devices to convert DC current from the intermediate DC circuit to provide AC electrical output power to a load.

In certain embodiments, the zero vector is selected at least in part according to the switching state of the second one of the rectifier and the inverter, the AC electrical input voltage, and the AC electrical output voltage to control at least one output common mode voltage.

In certain embodiments, the zero vector selection includes determining a common mode voltage of the second one of the rectifier and the inverter at least partially according to the second converter's switching state, as well as determining prospective common mode voltages associated with the first converter corresponding to the plurality of possible zero vectors, and selecting the zero vector for which an absolute value of a difference between the determined common mode voltages is the smallest.

Certain embodiments of the method include selecting the SVM zero vector at least partially according to the switching state of the second one of the rectifier and the inverter if the measured output common mode voltage is greater than a threshold value, and otherwise selecting the SVM zero vectors according to a different selection criteria.

Further aspects of the disclosure provide a non-transitory computer readable medium having computer executable instructions for controlling a current source converter drive. The computer readable medium has computer executable instructions for selecting one of a plurality of zero vectors for SVM of a first one of a rectifier and an inverter based at least in part on a switching state of a second one of the rectifier and the inverter. The medium also includes computer executable instructions for providing rectifier switching control signals to cause a plurality of rectifier switching devices of a rectifier to convert AC electrical input power to provide regulated DC power to an intermediate DC circuit, and providing inverter switching control signals to cause inverter switching devices to convert DC current from the intermediate DC circuit to provide AC electrical output power to a load.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 2B is a schematic diagram illustrating an exemplary zero vector selection embodiment for inverter control in the drive of FIG. 1.

DETAILED DESCRIPTION

Figure 1:
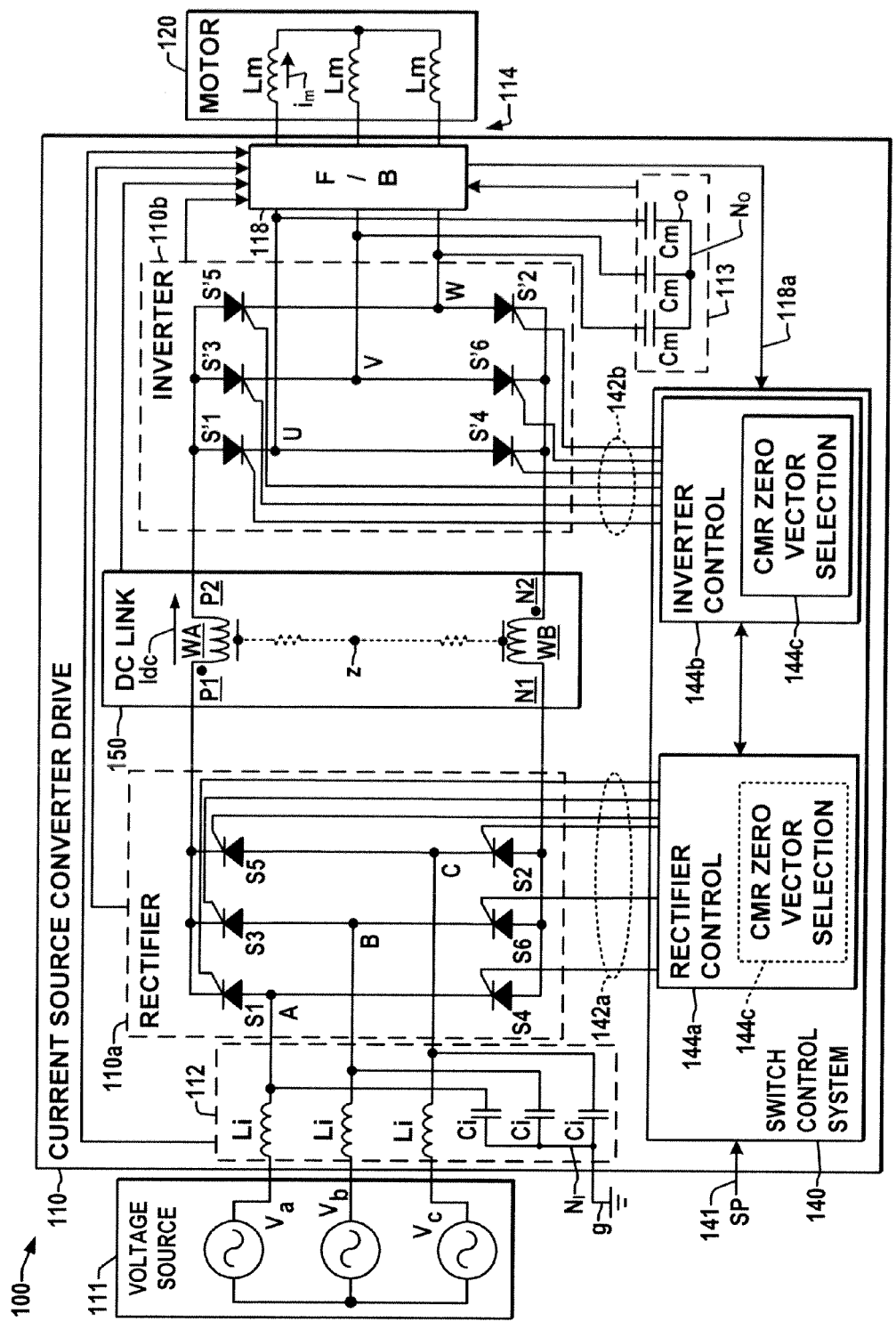
FIG. 1 is a schematic diagram illustrating an exemplary current source converter variable frequency motor drive with at least one common mode reduction zero vector selection component according to one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale.

FIG. 1 illustrates an exemplary power conversion system 100 having a current source converter (CSC) type motor drive 110 driving a motor load 120. The system 100 includes an exemplary three-phase AC voltage source 111 providing input power to the drive 110, and the drive 110 converts the input power to drive a motor load 120 coupled to a converter output 114. The drive 110 is a current source converter (CSC) type, with an input 112 connected to the AC power source 111. While these examples are illustrated as having a three phase input 112, other embodiments may provide a single phase AC input or may include a multiphase input adapted to receive three or more input phases.

The CSC drive 110 in FIG. 1 provides variable frequency, variable amplitude single or multiphase AC output power at output terminals 114 to drive an AC motor load 120, which has three phase windings in the illustrated example. The output 114 in other embodiments may provide a single phase AC output or may be of any number of phases, and may power a load other than a motor, such as a power grid in a wind energy system, for example. The illustrated motor drive 110 includes both input filter capacitors Ci in the input circuit 112, as well as output filter capacitors Cm in an output filter circuit 113. The input filter capacitors Ci are coupled between corresponding input phase lines A, B, and C and an input neutral node "g" ($N_I$). The output capacitors Cm are individually coupled between a corresponding output phase line U, V, and W and an output neutral node "o" ($N_O$). Certain embodiments may omit either or both of the input or output filter capacitor sets. The input and output neutral nodes $N_I$, $N_O$ may be floating in certain embodiments, or one or both of the neutrals $N_I$, $N_O$ may be coupled to the ground of the input power source or to another ground. In still other possible embodiments, the neutrals $N_I$, $N_O$ may be coupled to one another directly or through an impedance without reference to any system ground. In the illustrated example, the node g ($N_I$) is grounded.

The drive 110 includes a rectifier 110a receiving the AC input power from the source 111 via an input 112, as well as an intermediate DC circuit 150 with a DC link choke having upper and lower windings WA and WB coupled between the rectifier 110a and an output inverter 110b. In certain embodiments, the DC link could be a simple DC link inductor or a common mode choke with windings in each of the upper and lower Dc current paths as in the illustrated example. The illustrated drive 110 provides input filtering including inductors Li in each input phase and input filter capacitors Ci coupled between the input lines A, B, C, and the input neutral node g ($N_I$). The rectifier 110a is a current source rectifier (CSR) coupled with a current source inverter (CSI) 110b by the intermediate DC circuit 150, and one or more isolation components (e.g., transformers, not shown) may optionally be included in the drive 110. The output 114 provides AC electrical output power to the motor load 120 via lines U, V, and W, and includes filter circuit 113 with the output capacitors Cm coupled between the load 120 and the output neutral node o ($N_O$).

The rectifier 110a is an active switching-type current source rectifier (CSR) with switching devices S1-S6 coupled between the input 112 and the DC circuit 150 and operates according to a plurality of rectifier switching control signals 142a provided by a rectifier control component 144a of a switch control system 140. In operation, the AC input power is switched by the rectifier switches S1-S6 to create an intermediate DC link current Idc in the intermediate circuit 150. The exemplary inverter 110b is a current source inverter (CSI) that includes switching devices S'1-S'6 coupled between the DC circuit 150 and phase lines U, V, and W of the output 114. The inverter switches S'1-S'6 are operated according to corresponding switching control signals 142b from an inverter control component 144b of the switch control system 140 to selectively convert DC power from the DC circuit 150 to provide the AC output power to drive the motor load 120.

In the intermediate DC (link) circuit 150, the DC link choke or inductor links the switches of the rectifier 110a and the inverter 110b, and provides forward and return current paths therebetween. The first winding WA of the link choke is coupled in a forward or positive DC path and has a first end P1 connected to the upper rectifier switches S'1, S'3, and S'5 and a second end P2 coupled with the upper inverter switches S'1, S'3, and S'5. The second (lower) winding WB is coupled in a negative or return DC path and has a first end N1 coupled to the lower rectifier switches S2, S4, and S6 as well as a second end N2 coupled to the lower inverter switches S'2, S'4, and S'6. The DC link circuit 150, moreover, defines a virtual central voltage reference point or node "z" at a voltage potential of half the DC link voltage, defining a midpoint voltage Vz midway between the voltages of the first and second DC current paths. The switch control system 140 can obtain or compute a value for the voltage at this node z relative to ground g or other reference potential, for example, via measured signals from the feedback system 118.

The rectifier and inverter switching devices S1-S6, S'1-S'6 may be any suitable controllable electrical switch types (e.g., IGCTs, GTOs, thyristors, IGBTs, etc.) that are controlled according to any suitable type or form of switching scheme or schemes, such as phase control, pulse width modulation, etc., in open or closed-loop fashion. In certain embodiments, the switching devices S'1-S'6 of the inverter 110b are forced commutated devices including without limitation SGCTs, IGBTs or GTOs, and the switching devices S1-S6 of the rectifier 110a can be force commutated devices such as those mentioned above as well as line commutated devices such as Thyristors. In this regard, Thyristor devices could be used for the inverter switching devices S'1-S'6 in the form of forced commutated devices with extra circuitry added to the device triggering circuit thereof.

The rectifier 110a and the inverter 110b operate under control of the switch control system 140, which may include one or more processors and associated memory as well as I/O circuits including driver circuitry for generating switching control signals 142 to selectively actuate the switching devices S1-S6, S'1-S'6, although separate switching control systems may be employed, for example, with interconnections and information sharing to facilitate the coordinated operation of the rectifier 110a and the inverter 110b. The switch control system 140 in these embodiments includes an inverter control component 144b providing the inverter switching control signals 142b to cause the inverter 110b to selectively convert DC current from the intermediate DC circuit 150 to provide AC electrical power to the AC output 114 according to one or more setpoints 141, such as desired motor speed, torque, etc. The switch control system 140 and the components 144 thereof can be implemented as any suitable hardware, processor-executed software, processor-executed firmware, programmable logic, or combinations thereof, operative as any suitable controller or regulator by which the motor 120 is controlled according to one or more desired profile(s) or setpoint(s) 141, whether signals and/or digital values, in open or closed-loop fashion or combinations thereof.

In operation, moreover, a rectifier control component 144a of the controller 140 provides the rectifier switching control signals 142a to cause the rectifier 110a to convert AC electrical input power to provide a regulated DC current Idc to the DC circuit 150. In doing so, the rectifier controller 144a may employ one or more feedback signals or values 118a, such as a measured DC current value from the rectifier 110a representing the actual DC link current Idc and/or DC link voltage. The DC link current Idc from the rectifier 110a provides input current for conversion by the inverter 110b, where the exemplary inverter control 144b may provide a desired DC link current signal or value as a regulation setpoint to the rectifier controller 144a. In this manner, the rectifier 110a provides the DC current required by the inverter 110b, and the rectifier controller 144a may also implement other control functions such as power factor correction, while the inverter controller 144b performs the necessary motor control operation of the drive 110 according to one or more setpoint values or signals 141.

The drive 110 also includes a feedback system 118 including one or more sensing elements operative to provide one or more feedback signals and/or values 118a indicative of electrical conditions at the input 112, the rectifier 110a, the intermediate DC circuit 150, the inverter 110b, the output filter 113, and/or at the output 114. The switch control system 140 may be provided with one or more setpoints or desired values 141 and one or more feedback signals or values 118a from the feedback system 118 by which one or more closed loop motor drive control goals are achieved in normal motor drive operation. Feedback signals or values for the control functions can be based on signals and/or values 118a from the feedback system 118, measured input values (e.g., line voltages, neutral voltages, currents, etc.), and other information, data, etc., which may be in any suitable form such as an electrical signal, digital data, etc., and which may be received from any suitable source, such as one or more sensors, an external network, switches, a user interface associated with the system 100, or other suitable source(s). The feedback circuit 118 provides feedback signal(s) or value(s) to the controller 140 from at least one of the rectifier 110a, the DC circuit 150, and the inverter 110b, and may provide measured motor speed values through appropriate tachometers or other sensors, and/or sensed values from which motor speed, torque, current, and/or voltage, etc. may be determined by the controller 140. In this regard, sensorless motor speed feedback values may be generated internally by the controller 140 via suitable motor models based on the feedback signals or values 118a even for systems having no direct motor speed measurement sensors.

Figure 2A:
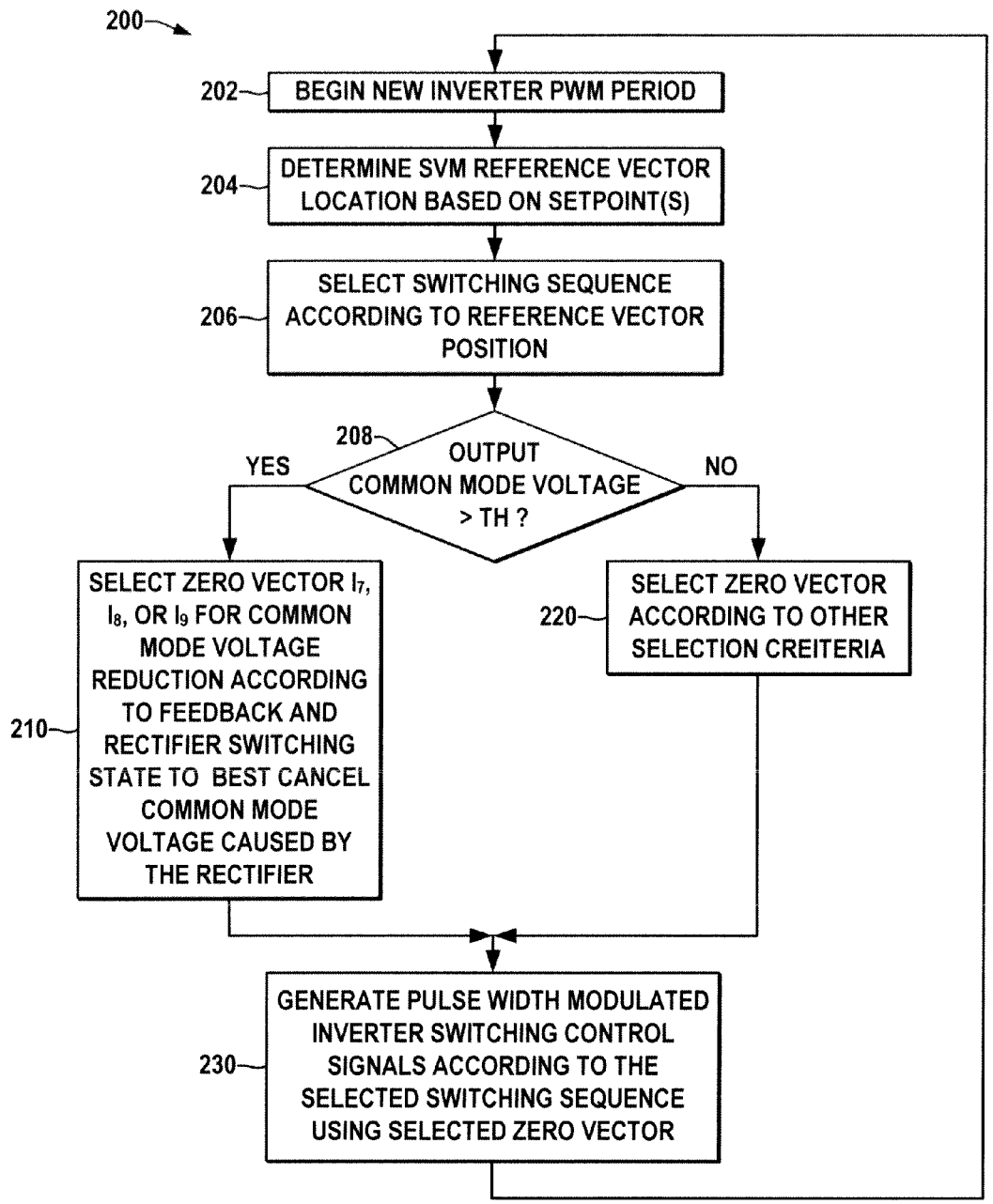
FIG. 2A is a flow diagram illustrating an exemplary method for controlling the output common mode voltage seen by a motor load by zero vector selection according to further aspects of the present disclosure.
Figure 3:
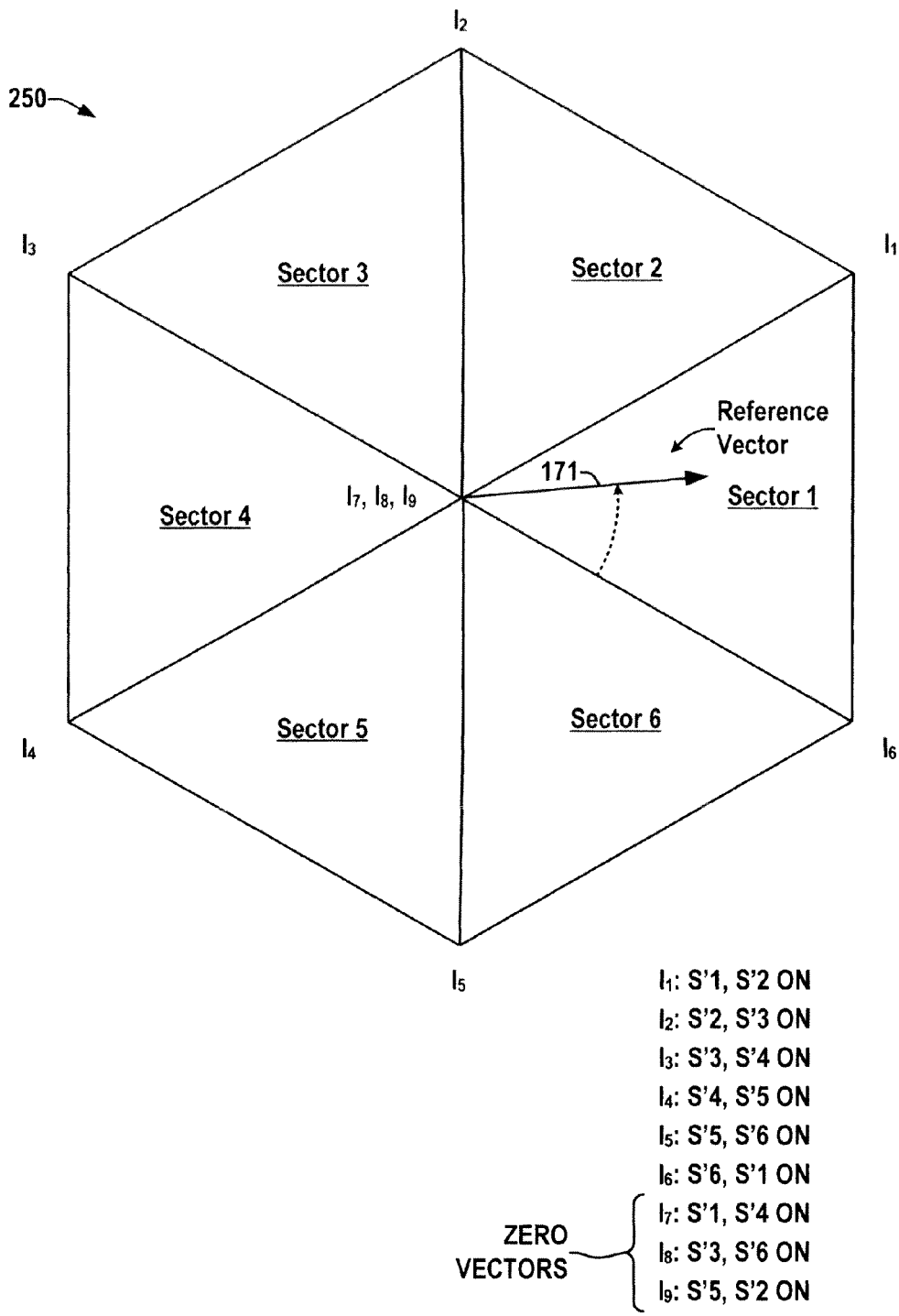
FIG. 3 is a schematic diagram illustrating an exemplary space vector modulation (SVM) diagram having six sectors and a rotating reference vector with peripheral corners defining active switching vectors used in the various common mode reduction pulse width modulation schemes of the present disclosure.

Referring also to FIGS. 2A, 2B, and 3, a process 200 is illustrated in FIG. 2A by which the switch control system 140 generates pulse width modulated switching control signals 142b for the inverter 110b using space vector modulation according to a set of switching sequences for each sector of a space vector modulation diagram 250 (FIG. 3). Although the PWM power converter control method 200 is illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, processor-executed software, or combinations thereof, in order to provide the common mode reduction pulse width modulation control functionality described herein, and may be employed in any power conversion system including but not limited to the above illustrated drive 110, wherein the disclosure is not limited to the specific applications and embodiments illustrated and described herein.

The switch control system 140 generates the pulse width modulated switching control signals 142b for the inverter 110b using space vector modulation according to a set of switching sequences for each sector of a space vector modulation diagram 250 (FIG. 3). The exemplary space vector modulation diagram 250 includes six stationary active space vectors $I_1$-$I_6$ positioned counterclockwise (CCW) around the periphery of the diagram 250 as well as three stationary zero vectors $I_7$-$I_9$ located at the diagram origin, where the active and zero vectors $I_1$-$I_9$ represent unique switching states for the inverter switching network S'1-S'6. The diagram 250 is representative of SVM techniques employed in embodiments in which the switches S1-S6 of the rectifier 110a are controlled by space vector modulation. The diagram 250 also defines six triangular sectors (labeled Sector 1 through Sector 6 in FIG. 3) positioned around the origin, each of which is defined by a unique set of two of the active vectors $I_1$-$I_6$ and the zero vectors $I_7$-$I_9$ at the corners of the corresponding triangular segment. To operate the inverter 110b, the switch control system 140 provides the switching control signals 142b according to a selected switching sequence corresponding to the diagram sector in which the reference vector 171 is currently located, with the sequence and corresponding dwell times determined at least partially according to one or more feedback signals or values 118a from the feedback system 118. The inverter switching control signals 142b are provided pulse width modulation according to the vectors and dwell times determined for each vector in the sequence based on the reference vector position.

In certain embodiments, at least one of the control components 142a and 142b includes a common mode reduction (CMR) zero vector selection component 144c to select from a plurality of possible zero vectors in implementing SVM control of the corresponding converter 110. The SVM for a first one of the converters 110 is done using a zero vector selected at least partially according to the switching state of the other converter 110. In one implementation of the exemplary embodiment of FIG. 1, the inverter switch control component 144b includes a CMR zero vector selection component 144c that selectively coordinates the control of the inverter 110b based at least in part on the switching state of the rectifier 110a so as to control (e.g., reduce) the output common mode voltage seen by the motor load 120. In other embodiments, the rectifier 110a is controlled using space vector modulation (e.g., for regenerative operation), with the rectifier control component 244a including a CMR zero vector selection component 144c that selects from a number of possible zero vectors based at least in part on the switching state of the inverter 110b.

In the illustrated first embodiment, the inverter control component 144b and the zero vector selection component 144c thereof are operated generally according to the process 200 of FIGS. 2A and 2B. In particular, the inverter control component 144b is operative to select one of the possible zero vectors $I_7$, $I_8$, $I_9$ for space vector modulation of the inverter 110b via the signals 142b at least partially according to the switching state of the rectifier 110a. In certain implementations, the inverter SVM zero vector selection is done according to the rectifier switching state, the AC electrical input voltage, and the AC electrical output voltage to control at least one output common mode voltage, such as the common mode voltage Vog at the output filter circuit neutral ($N_O$) with respect to line neutral filter circuit neutral g (Ni). In this manner, at least to some extent, the common mode effects associated with the rectifier operation can be cancelled or lessened by controlled switching in the inverter 110b, thus facilitating control of the overall common mode voltages seen at the drive output 114, while allowing the expanded freedoms associated with space vector modulation control (e.g., modulation index control). The SVM control of the inverter 110b may be combined with selective harmonic elimination (SHE), space vector modulation and/or trapezoidal pulse width modulation control of the rectifier 110a in certain implementations.

The exemplary inverter SVM control process 200 begins at 202 in FIG. 2A for a new PWM period, with the inverter control component 144b of the switch control system 140 controlling the inverter 110b through generation of the pulse width modulated signals 142b. At 204, a reference vector location is determined (e.g., reference vector 171 in FIG. 3), which in some embodiments may be determined according to feedback signals or values from the feedback system 118 and/or received setpoint information 141. For instance, the desired motor position and torque may be represented in terms of the magnitude and angle of the SVM reference vector 171. At 206-220, the inverter control component 144b selects a switching sequence based on the reference vector position, where the segment in which the reference vector is situated defines two active vectors, and the controller 144b selects a zero vector to establish the switching pattern for a given PWM period, and the angle and magnitude of the reference vector determine the dwell times for the active vectors and for a selected zero vector. At 230, the controller 144b generates the PWM inverter switching control signals 142b according to the selected sequence and selected zero vector for controlling the switching devices S'1-S'6 of the inverter 110b, after which the process 200 returns to 202 for subsequent inverter PWM periods.

In certain embodiments, the inverter controller 144b compares a measured common mode output voltage with a threshold TH at 208. In these embodiments, the controller 144b selects one of the zero vectors $I_7$, $I_8$, $I_9$ (FIG. 3) at 210 in FIG. 2A for inverter SVM control based at least partially on the switching state of the rectifier 110a if the measured output common mode voltage(s) exceeds the threshold TH. Otherwise (NO at 208), the inverter SVM zero vector is selected at 220 according to a different selection criteria. In this manner, the controller 144b can selectively employ zero vector selection for common mode voltage reduction in situations where the common mode voltage is high, but can mitigate efficiency losses and other problems associated with high switching frequencies when common mode reduction is not needed.

Referring also to FIG. 2B, when the measured common mode output voltage is high (YES at 208 in FIG. 2A), the controller 144b bases the SVM zero vector selection at least in part on the rectifier switching state. In one example, the controller 144b determines a common mode voltage Vzg associated with the rectifier 110a at 212 at least partially according to the switching state of the rectifier 110a and the AC input voltages a, b, and c using the illustrated table according to the active vectors set by the rectifier controller 144a, where this determination may, but need not, factor in rectifier switching state dwell times. At 214, the inverter controller 144b determines prospective common mode voltages Vzo associated with the inverter 110b for each of the possible zero vectors $I_7$, $I_8$, $I_9$ for inverter SVM control. In the illustrated example, the controller 144b solves the formula for Vzo three times (once using $I_7$, another using $I_8$, and another using $I_9$), where each evaluation uses the selected active switching vectors and the latest u, v, and w values from the feedback system 118. The determination at 214, moreover, may, but need not, factor in the inverter dwell times for the rectifier switching vectors as determined according to the reference vector position. At 216, the inverter control component 144b selects the zero vector ($I_7$, $I_8$, or $I_9$) for which the absolute value of the difference between the determined common mode voltages Vzg and Vzo (Vog=|Vzg−Vzo|) is the smallest. This selected zero vector is then used with the active vectors and dwell times computed according to the reference vector position in implementing the SVM control of the inverter 110b via generation of the signals 142b. The process of zero vector selection in certain embodiments is repeated when the switching state of the rectifier changes or when the inverter is about to switch into a zero vector switching state.

To illustrate the common mode reduction benefits of the disclosed common mode zero vector selection approach, the inventors have found that the output common mode voltage of the CSC drive 110 can be calculated from the common mode voltage contributions of the rectifier 110a and of the inverter 110b. The rectifier common mode voltage Vzg at the intermediate midpoint virtual node z (FIG. 1) is given (relative to nodes P1 and N1 with respect to grounded node g in FIG. 1 above) by the following equation (1):

$$V_{zg}=0.5(V_{P1}+V_{N1}), \quad (1)$$

where $$V_{P1}=S_1 a+S_3 b+S_5 c=[S_1\ S_3\ S_5][a\ b\ c]', \quad (2)$$

$$V_{N1}=S_4 a+S_6 b+S_2 c=[S_4\ S_6\ S_2][a\ b\ c]', \quad (3)$$

and where $S_1$ to $S_6$ are the switching states of the rectifier switching devices S1-S6 in FIG. 1, and [a b c]' is an array of the instantaneous three-phase phase-to-neutral voltage on the line side rectifier input 112.

Combining these equations, the rectifier part Vzg of the output common mode voltage is given by the following equation (4):

$$V_{zg}=0.5[S_1+S_4\ S_3+S_6\ S_5+S_2][a\ b\ c]'. \quad (4)$$

For selective harmonic elimination (SHE) modulation of the rectifier 110a without bypass pulses (BP) or trapezoidal PWM (TPWM), the maximum Vzg equals half the peak of the input phase to neutral voltage. Without bypass pulses, $[S_1+S_4\ S_3+S_6\ S_5+S_2]$ must take one of the following 3 values: [1 1 0], [1 0 1] or [0 1 1]. The common mode voltage caused by rectifier 110a will be enveloped by −0.5a, −0.5b and −0.5c for a balanced system. For Space Vector Modulation (SVM) or SHE with bypass pulses, $[S_1+S_4\ S_3+S_6\ S_5+S_2]$ can also take the following values in BP operation: [2 0 0], [0 2 0] and [0 0 2] in addition to the above three values, which will result higher common mode voltage contribution by the rectifier 110a. In this case, the maximum Vzg equals the peak phase-to-neutral voltage of the input source 111. The inventors have appreciated that bypass pulses may be useful in controlling the rectifier 110a where modulation index control is desirable, for example, to implement power factor correction (PFC) or dynamic breaking, or where a shot-through is needed to protect the semiconductors, for example during bus transients to isolate the converter system from input line voltage spikes. Thus, the rectifier common mode voltage contribution Vzg is a function of rectifier switching states and rectifier input voltage.

The common mode voltage caused by the inverter 110b can be expressed as:

$$V_{zo}=0.5(V_{P2}+V_{N2}), \quad (5)$$

where $$V_{P2}=S'_1 u+S'_3 v+S'_5 w=[S'_1\ S'_3\ S'_5][u\ v\ w]', \quad (6)$$

$$V_{N2}=S'_4 u+S'_6 v+S'_2 w=[S'_4\ S_6\ S_2][u\ v\ w], \quad (7)$$

and where $S'_1$ to $S'_6$ are the switching states of the inverter switching devices S'1 to S'6 (FIG. 1) and [u v w]' is an array of the instantaneous three-phase phase-to-neutral output voltage of the load 120. Consequently, the inverter common mode contribution Vzo can be described as:

$$V_{zo}=0.5[S'_1+S'_4\ S'_3+S'_6\ S'_5+S'_2][u\ v\ w]', \quad (8)$$

which is thus a function of the inverter switching states and load terminal voltage.

The inventors have appreciated that the inverter common mode voltage Vzo is thus affected by the switching state of the rectifier 110a, and the output common mode voltage Vog can be reflected by the following equations:

$$V_{og} = V_{cg} + V_{zo} \quad (9)$$

or $$V_{og} = 0.5\left([S_1 + S_4 S_3 + S_6 S_5 + S_2]\begin{bmatrix}a\\b\\c\end{bmatrix} - [S'_1 + S'_4 S'_3 + S'_6 S'_5 + S'_2]\begin{bmatrix}u\\v\\w\end{bmatrix}\right) \quad (10)$$

In an exemplary implementation of a medium voltage CSC motor drive 110 receiving a 4200 VAC input, the maximum peak common mode voltage without the CMR zero vector selection aspects described above, are shown in Table 1 below for different inverter and rectifier PWM patterns.

TABLE 1

| System: $V_l$ = 4200 V | Inverter | |
|---|---|---|
| Motor: $V_m$ = 4000 V | TPWM/SHE | SVM |
| Rectifier SHE | $0.43 V_l + 0.41 V_m$ = 3440 | $0.43 V_l + 0.82 V_m$ = 5070 V |
| SVM | $0.86 V_l + 0.41 V_m$ = 5240 | $0.86 V_l + 0.82 V_m$ = 6870 |

As seen in the above table, the worst case common mode output voltage is possible when the inverter 110b is controlled via SVM, where the output common mode voltage Vog can exceed 6800 volts. To avoid high voltage stress on the load, this voltage is handled by a common mode voltage choke, disclosed in U.S. Pat. No. 6,617,814 B1 to Bin Wu and U.S. Pat. No. 7,274,576 B1 to Navid Zargari, incorporated herein by reference. The present disclosure provides a solution to reduce the converter output common mode voltages for current source converter drives 110. In this regard, either of the rectifier 110a and/or the inverter 110b can be operated by SVM techniques, thereby facilitating PFC control by the rectifier 110a and advanced modulation index control for the inverter 110b in driving a variable frequency motor load 120, while controlling the common mode voltages seen at the motor 120, and without requiring oversized link inductors or costly, large output filter circuits 113. Moreover, the inventors have appreciated that the intelligent zero vector selection technique described above may increase the switching frequency of the SVM operated converter, and the usage of the threshold value at 208 in FIG. 2A allows a design tradeoff that avoids increased switching frequency when common mode voltages are in an acceptable range, but then employs zero vector selection according to the other converter switching state to reduce excessive common mode voltages when needed. Thus, in one example, the zero vector can be selected at 220 according to reducing the number of switch transitions or according to other suitable selection criteria when the measured common mode voltage is below the threshold (e.g., such as a threshold TH=3500V for a 4160V drive 110), and the common mode reduction zero vector selection approach is used once that threshold is exceeded (at the expense of increased inverter switching frequency).

In accordance with further aspects of the present disclosure, a non-transitory computer readable medium is provided, such as a computer memory, a memory within a power converter control system (e.g., switch control system 140 above, a CD-ROM, floppy disk, flash drive, database, server, computer, etc.) which has computer executable instructions for performing the processes described above.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A current source converter drive, comprising:
a rectifier comprising an AC input having a plurality of AC input nodes to receive AC electrical input power, a DC output with first and second DC output nodes, and a rectifier switching network including a plurality of rectifier switching devices individually coupled between one of the AC input nodes and one of the first and second DC output nodes, the rectifier switching devices individually operative to selectively couple the AC input node with the corresponding DC output node according to a corresponding rectifier switching control signal;
an intermediate DC circuit comprising first and second DC current paths and at least one inductance;
an inverter comprising an AC output with a plurality of AC output nodes for supplying power to a load, and an inverter switching network comprising a plurality of inverter switching devices individually coupled between one of the DC current paths of the intermediate DC circuit and one of the AC output nodes, the inverter switching devices individually operative to selectively electrically couple the corresponding DC current path with the corresponding AC output node according to a corresponding inverter switching control signal to provide AC electrical output power to the load; and
a switch control system, comprising a rectifier control component operative to provide the rectifier switching control signals to cause the rectifier to convert AC electrical input power to provide regulated DC power to the intermediate DC circuit, and an inverter control component operative to provide the inverter switching control signals to cause the inverter to selectively convert DC current from the intermediate DC circuit to provide AC electrical power to the AC output according to at least one setpoint signal or value, a first one of the rectifier control component and the inverter control component being operative to select one of a plurality of zero vectors for space vector modulation of a corresponding first one of the rectifier and the inverter at least partially according to a switching state of a second one of the rectifier and the inverter;
where the first one of the rectifier control component and the inverter control component is operative to select one of the plurality of zero vectors for space vector modulation of the first one of the rectifier and the inverter at least partially according to a switching state of a second one of the rectifier and the inverter if at least one measured output common mode voltage is greater than a threshold value and to select one of the plurality of zero vectors for space vector modulation of the first one of the rectifier and the inverter according to a different selection criteria if the at least one measured output common mode voltage is less than the threshold value.

2. A current source converter drive, comprising:
a rectifier comprising an AC input having a plurality of AC input nodes to receive AC electrical input power, a DC output with first and second DC output nodes, and a rectifier switching network including a plurality of rectifier switching devices individually coupled between one of the AC input nodes and one of the first and second DC output nodes, the rectifier switching devices individually operative to selectively couple the AC input node with the corresponding DC output node according to a corresponding rectifier switching control signal;

an intermediate DC circuit comprising first and second DC current paths and at least one inductance;

an inverter comprising an AC output with a plurality of AC output nodes for supplying power to a load, and an inverter switching network comprising a plurality of inverter switching devices individually coupled between one of the DC current paths of the intermediate DC circuit and one of the AC output nodes, the inverter switching devices individually operative to selectively electrically couple the corresponding DC current path with the corresponding AC output node according to a corresponding inverter switching control signal to provide AC electrical output power to the load; and a switch control system, comprising a rectifier control component operative to provide the rectifier switching control signals to cause the rectifier to convert AC electrical input power to provide regulated DC power to the intermediate DC circuit, and an inverter control component operative to provide the inverter switching control signals to cause the inverter to selectively convert DC current from the intermediate DC circuit to provide AC electrical power to the AC output according to at least one setpoint signal or value, a first one of the rectifier control component and the inverter control component being operative to select one of a plurality of zero vectors for space vector modulation of a corresponding first one of the rectifier and the inverter at least partially according to a switching state of a second one of the rectifier and the inverter, the AC electrical input voltage, and the AC electrical output voltage to control at least one output common mode voltage.

3. The drive of claim 2, where the first one of the rectifier control component and the inverter control component is operative to select one of the plurality of zero vectors for space vector modulation of the first one of the rectifier and the inverter at least partially according to a switching state of a second one of the rectifier and the inverter if at least one measured output common mode voltage is greater than a threshold value and to select one of the plurality of zero vectors for space vector modulation of the first one of the rectifier and the inverter according to a different selection criteria if the at least one measured output common mode voltage is less than the threshold value.

4. The drive of claim 2, where the first one of the rectifier control component and the inverter control component is the inverter control component, where a second one of the rectifier control component and the inverter control component is the rectifier control component, where the first one of the rectifier and the inverter is the inverter, and where the second one of the rectifier and the inverter is the rectifier.

5. The drive of claim 2, where the second one of the rectifier control component and the inverter control component is operative to provide the corresponding one of the rectifier switching control signals and the inverter switching control signals using selective harmonic elimination pulse width modulation, space vector modulation or trapezoidal pulse width modulation.

6. The drive of claim 2, where the first one of the rectifier control component and the inverter control component is operative to determine a common mode voltage associated with the second one of the rectifier and the inverter at least partially according to the switching state of the second one of the rectifier and the inverter, to determine prospective common mode voltages associated with the first one of the rectifier and the inverter corresponding to the plurality of possible zero vectors for space vector modulation of the first one of the rectifier and the inverter, and to select one of the plurality of zero vectors for space vector modulation of the first one of the rectifier and the inverter for which an absolute value of a difference between the determined common mode voltages is the smallest.

7. The drive of claim 6, where the first one of the rectifier control component and the inverter control component is the inverter control component, where a second one of the rectifier control component and the inverter control component is the rectifier control component, where the first one of the rectifier and the inverter is the inverter, and where the second one of the rectifier and the inverter is the rectifier.

8. The drive of claim 6, where the second one of the rectifier control component and the inverter control component is operative to provide the corresponding one of the rectifier switching control signals and the inverter switching control signals using selective harmonic elimination pulse width modulation, space vector modulation or trapezoidal pulse width modulation.

9. The drive of claim 6, where the first one of the rectifier control component and the inverter control component is operative to select one of the plurality of zero vectors for space vector modulation of the first one of the rectifier and the inverter at least partially according to a switching state of a second one of the rectifier and the inverter if at least one measured output common mode voltage is greater than a threshold value and to select one of the plurality of zero vectors for space vector modulation of the first one of the rectifier and the inverter according to a different selection criteria if the at least one measured output common mode voltage is less than the threshold value.

10. The drive of claim 9, where the first one of the rectifier control component and the inverter control component is the inverter control component, where a second one of the rectifier control component and the inverter control component is the rectifier control component, where the first one of the rectifier and the inverter is the inverter, and where the second one of the rectifier and the inverter is the rectifier.

11. The drive of claim 9, where the second one of the rectifier control component and the inverter control component is operative to provide the corresponding one of the rectifier switching control signals and the inverter switching control signals using selective harmonic elimination pulse width modulation, space vector modulation or trapezoidal pulse width modulation.

12. The drive of claim 10, where the rectifier control component is operative to provide the rectifier switching control signals using selective harmonic elimination pulse width modulation, space vector modulation or trapezoidal pulse width modulation.

13. A method of controlling a current source converter drive, the method comprising:
selecting one of a plurality of zero vectors for space vector modulation of a first one of a rectifier and a inverter at least partially according to a switching state of a second one of the rectifier and the inverter;
providing rectifier switching control signals to cause a plurality of rectifier switching devices of a rectifier to convert AC electrical input power to provide regulated DC power to an intermediate DC circuit: and providing inverter switching control signals to cause a plurality of inverter switching devices of an inverter to convert DC current from the intermediate DC circuit to provide AC electrical output power to a load:

where one of the plurality of zero vectors is selected at least partially according to the switching state of the second one of the rectifier and the inverter, the AC electrical input voltage, and the AC electrical output voltage to control at least one output common mode voltage.

14. A method of controlling a current source converter drive, the method comprising:

selecting one of a plurality of zero vectors for space vector modulation of a first one of a rectifier and a inverter at least partially according to a switching state of a second one of the rectifier and the inverter;

providing rectifier switching control signals to cause a plurality of rectifier switching devices of a rectifier to convert AC electrical input power to provide regulated DC power to an intermediate DC circuit; and providing inverter switching control signals to cause a plurality of inverter switching devices of an inverter to convert DC current from the intermediate DC circuit to provide AC electrical output power to a load;

where selecting one of the plurality of zero vectors for space vector modulation of the first one of the rectifier and the inverter comprises:

determining a common mode voltage associated with the second one of the rectifier and the inverter at least partially according to the switching state of the second one of the rectifier and the inverter, determining prospective common mode voltages associated with the first one of the rectifier and the inverter corresponding to the plurality of possible zero vectors for space vector modulation of the first one of the rectifier and the inverter, and selecting one of the plurality of zero vectors for space vector modulation of the first one of the rectifier and the inverter for which an absolute value of a difference between the determined common mode voltages is the smallest.

15. A method of controlling a current source converter drive, the method comprising:

selecting one of a plurality of zero vectors for space vector modulation of a first one of a rectifier and a inverter at least partially according to a switching state of a second one of the rectifier and the inverter;

selecting one of the plurality of zero vectors for space vector modulation of the first one of the rectifier and the inverter at least partially according to the switching state of a second one of the rectifier and the inverter if at least one measured output common mode voltage is greater than a threshold value;

selecting one of the plurality of zero vectors for space vector modulation of the first one of the rectifier and the inverter according to a different selection criteria if the at least one measured output common mode voltage is less than the threshold value;

providing rectifier switching control signals to cause a plurality of rectifier switching devices of a rectifier to convert AC electrical input power to provide regulated DC power to an intermediate DC circuit; and providing inverter switching control signals to cause a plurality of inverter switching devices of an inverter to convert DC current from the intermediate DC circuit to provide AC electrical output power to a load.

* * * * *